INVENTOR
GARETH ALLAN KEITH

BY Chittick, Pfund, Birch, Samuels & Gauthier

ATTORNEYS

INVENTOR
GARETH ALLAN KEITH

ATTORNEYS

INVENTOR
GARETH ALLAN KEITH

BY

ATTORNEYS

United States Patent Office 3,606,911
Patented Sept. 21, 1971

3,606,911
INVERTIBLE VALVE TRIM FOR CONTROL VALVES
Gareth Allan Keith, Needham, Mass., assignor to Masoneilan International, Inc., Norwood, Mass.
Filed Nov. 14, 1969, Ser. No. 876,687
Int. Cl. F16k 1/54
U.S. Cl. 137—269     15 Claims

ABSTRACT OF THE DISCLOSURE

A valve trim cage with a tubular body provided with reversible ends and flow controlling port means differently characterized axially of the body. In a double embodiment the cage extends to either side of the valve body partition, and is provided with an intermediate double faced seat for the valve plug. In a single embodiment the cage engages a slip ring which seats also the valve plug. In the double embodiment the port means are differently characterized to either side of the valve seat, and in the single embodiment the port means are differently characterized at opposite axial end portions. The single embodiment provides for different flow controlling by inverting of the cage, and the double embodiment provides for different flow controlling both by said inverting and by repositioning of the plug from one to the other side of said partition.

---

This invention provides an invertible valve trim for control valves, and which provides for characterized flow control while allowing the use of a single actuator action, whether of a direct or reverse actuator, for all possible valve operating directions and failure positions. Under the invention different flow controlling characteristics are produced, upon the inverting of the trim, or either upon said inverting or upon repositioning the valve plug.

The invention will be clearly understood from the following description taken together with the accompanying drawings in which.

Figure 1:
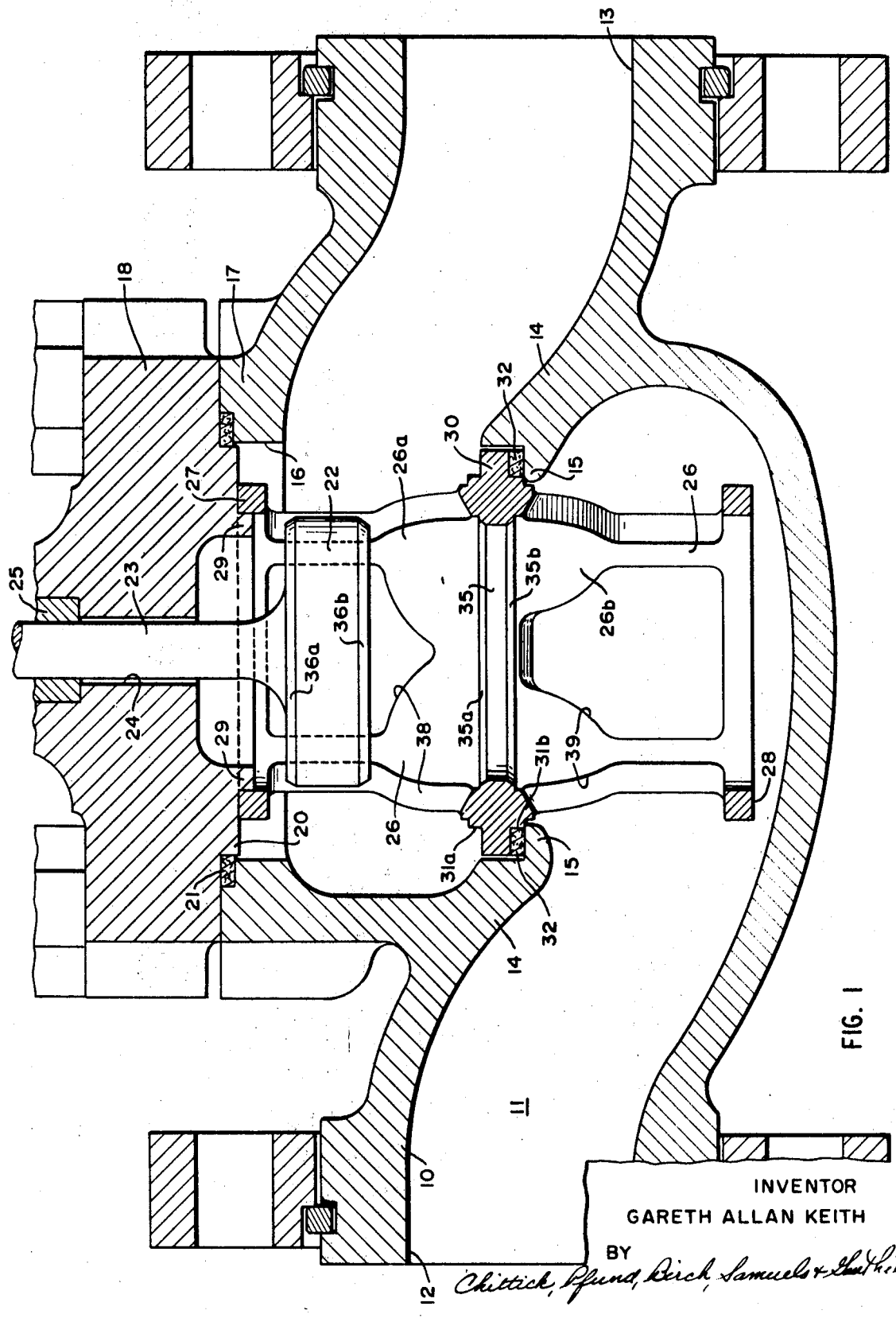
FIG. 1 is a vertical section of one embodiment of the invention apparatus.

In the apparatus hereof, a valve body or housing 10 is apertured by a fluid passage 11 defining inlet and outlet openings 12, 13.

Intermediate the passage 11 the body 10 is formed interiorly with a transverse partition 14 constricting the fluid passage 11 thereat to an annular opening or port therethrough as defined by the lip or ledge 15.

Opposite the partition 14 the body 10 has an upper wall aperture 16 defined by an annular seat or shoulder 17 to which a bonnet 18 is secured by studs 19 or the like. The aperture 16 is seen as coaxial with the partition 14 port, and as closely surrounding a dependent shoulder 20 of the bonnet 18 to which it may be sealed as by a gasket 21.

Also received through the body wall opening 16 is a usual valve plug 22 having a stem 23 received in a bonnet bore 24 axially aligned with the transverse partition port, and provided with the usual stem guiding and sealing packing 25.

It will be understood that the plug 22 is controlled by an actuator, as hereinafter mentioned, for vertical, valve opening-closing movement to either side of the ported partition 14, being smaller than its opening as defined by the ledge 15.

The novel valve trim hereof comprises a cage 26 having a generally tubular body which is seen to relatively closely enclose the plug 22, and except at the ledge 15 to be spaced from the walls of the fluid passage 11.

In accordance with the invention, the cage 26 is invertible, and formed at its opposite ends with similar annular end faces 27, 28, said faces for alternately bearing against the bonnet 18, and adapted also for centering the cage 26 within the opening 16 by close concentric interfitting with a dependent annular bonnet shoulder 29 received therewithin as shown.

Figure 2:
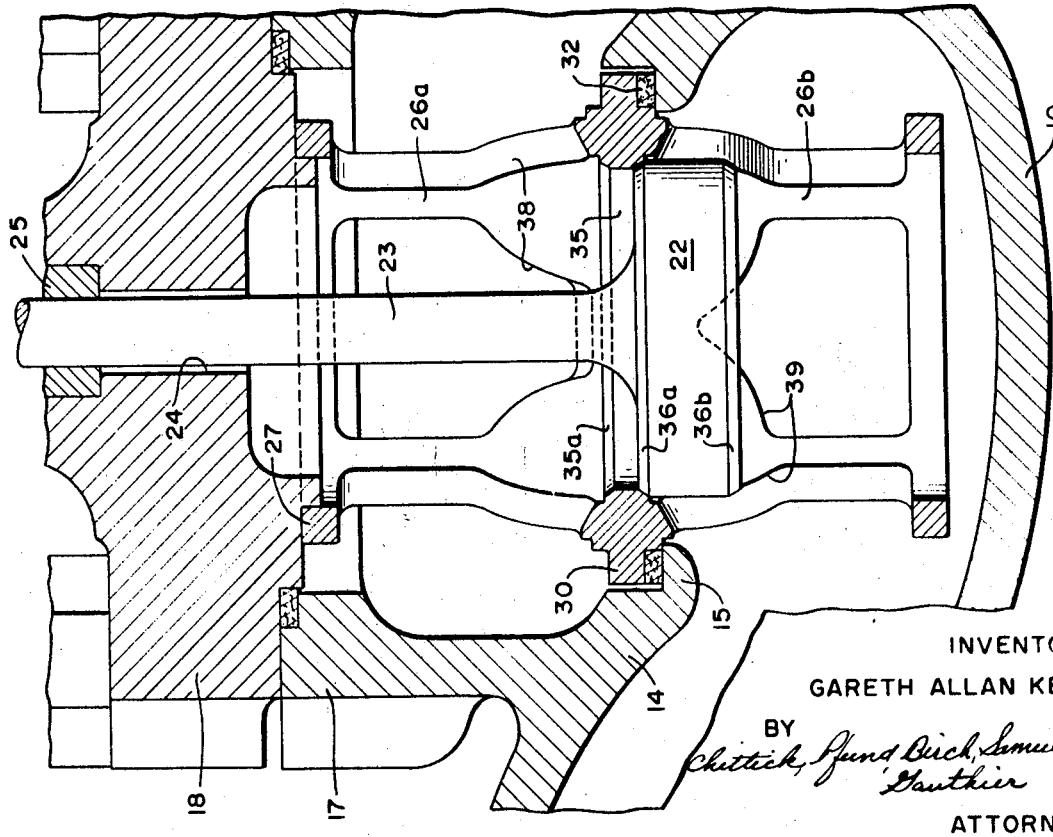
FIG. 2 is a like view of the FIG. 1 embodiment but with the parts differently positioned.

In the FIGS. 1 and 2 embodiment the cage 26 extends through the partition port, and is formed for clamping between the partition 14 and bonnet 18 with an intermediate peripheral flange 30 formed at its opposite faces with like shoulders 31a, 31b for hooking over the partition ledge 15, to which the flange 30 may be sealed as by a gasket 32 recessed within one or the other of the parts.

Figure 3:
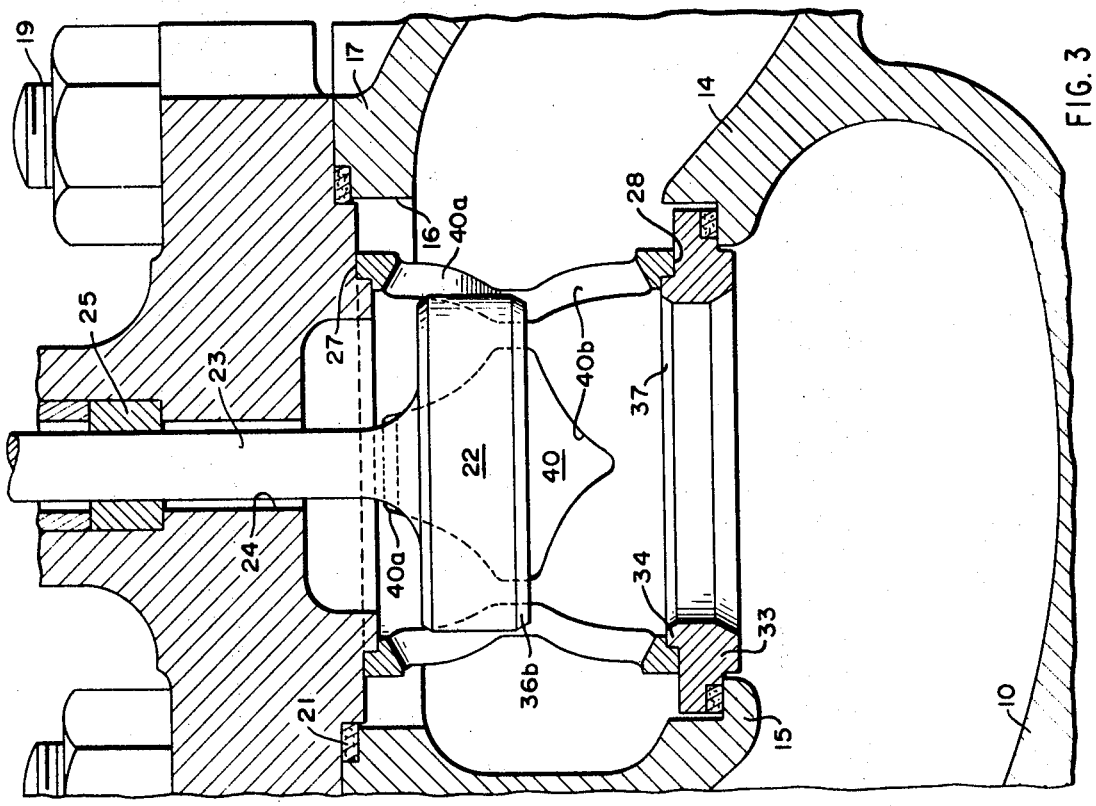
FIG. 3 shows similarly another embodiment of the invention apparatus.

In the FIG. 3 embodiment, the cage 26 is seen as confined wholly between the bonnet 18 and partition 14, and engaged to the latter through an intermediate slip in seat ring 33 sealed similarly as the flange 30 by gasket 32. Seat ring 33 is provided with an upstanding annular flange 34, the same serving in part to snugly fit within and center the bottom end similarly as the dependent bonnet shoulder 29 centers the top end of the cage 26.

The valve trim hereof further provides means for seating the plug 22, as actuator-controlled to close the valve.

In the FIGS. 1 and 2 embodiment said plug seating means comprises an internal annular seat ring 35, which may as herein be integral with the flange 30, and which presents at its opposite faces tapered seating surfaces 35a, 35b, mating with like tapered surfaces 36a, 36b with which the herein disc plug 22 is similarly provided at its opposite faces.

As just described, then, the FIGS. 1 and 2 embodiment provides for the seating of plug 22 at either of its surfaces 36a, 36b to either side of ring 34, or at either one of its mating seating surfaces 35a, 35b. With this embodiment, in other words, the plug 22 may be controlled for valve opening-closing movement to either side of the partition 14 and cage seat ring 35, and with the cage 26 oriented to the position of FIG. 1, or inverted to the position of FIG. 2.

In the modified form of FIG. 3, the cage 26 is invertibly clamped as described between the bonnet 18 and seat ring 33, and the latter is provided at its centering flange 34 with a bevel 37 defining a seating surface tapered similarly as, and for sealing engagement by, the mating surface 36b of plug 22.

In accordance with the invention, the trim cage 26 is provided with flow controlling port means comprising one or more sets of one or more openings through the wall of the tubular body, and arranged for covering and uncovering by the described, actuator controlled movement of plug 22. Further, said port means are differently characterized axially of the cage 26, whereby for the same movement of the plug 22 the flow through passage 11 may be differently controlled by inverting the cage.

In the FIGS. 1 and 2 embodiment, the cage has in the portion 26a to one side of flange 30 four identical, equidistantly spaced, transversely aligned flow controlling openings or ports 38, and in the portion 26b to the other side of flange 30 a like balanced plurality of, or set of correspondingly placed and proportioned, flow controlling openings or ports 39. The openings 38, 39 are seen as oppositely oriented for increasing flow as the plug 22 moves in either the upward or downward direction from the intermediate seated position. Further, the openings of each set 38, 39 are formed to different flow controlling characteristics, and to that end may have any desired but different configurations, the linear and equal percentage configurations herein shown being merely exemplary.

As just described the FIGS. 1 and 2 embodiment is seen to provide openings or ports of one flow controlling characteristic in one axial cage body portion, and openings or ports of a different flow controlling characteristic in another axial cage body portion. Further, the juxtapositioning of the axial cage body portions 26a, 26b is equal and opposite relative to the intermediate flange 30, such that upon the inverting of the cage 26 there is had a corresponding, differently characterized control of the flow through valve body 10. The FIGS. 1 and 2 embodiment also provides, then, for selecting or shifting between one or the other desired flow controlling characteristic by coupling the valve stem actuator for locating of the plug 22 to one or the other side of, and for opening-closing movement in one or the opposite direction relative to, the intermediate partition 14.

In the FIG. 3 embodiment the flow controlling port means comprise a balanced plurality of similarly formed openings through the tubular cage wall, the openings formed in one axial portion to one desired flow controlling characteristic and in the opposite axial portion to another desired flow controlling characteristic, and with said opposite opening portions longitudinally positioned such that the one axial portion is uncovered by the opening movement of the plug in one position of the cage body, and the opposite axial portion is uncovered by the opening movement of the plug in the inverted position of the cage body.

As herein shown, then, the single-section embodiment of FIG. 3 comprises a set of four aligned, duplicate openings or ports 40 equidistantly spaced from each other and from the cage ends 27, 28 and formed at one axial 40a end to one flow controlling characteristic, and at the opposite axial end 40b to a different flow controlling characteristic. In the FIG. 3 embodiment the flow controlling ports 40 are seen more particularly and by their opposite ends 40a, 40b to combine back-to-back the valve opening or flow characterizing portions of the FIGS. 1 and 2 embodiment openings or ports 38, 39.

The FIGS. 1 and 2 embodiment will be understood by those skilled in the art to allow the use of a single actuator action for all possible valve operating directions and failure positions, and with the option of either a reverse or a direct actuator. This is seen to be accomplished by provision of a trim which is both invertible and provided with two sets of characterized flow ports. And while herein illustrated as for producing linear and equal percentage flows, the ports could be shaped to produce any desired flow characteristic.

The modified cage form of FIG. 3 has been shown to provide double axial ended flow ports, that are differently characterized at the opposite ends, and arranged such that in the one cage position the actuator controlled plug lift exposes one end, and in the inverted cage position the plug lift exposes the other end, of each port, whereby a selected one of two available flow characteristics is produced. And, as will be understood by those skilled in the art, the single cage type unit of FIG. 3 is also adapted for both the aforementioned direct and reverse actuators, and provides a retainer for the slip-in seat ring employed therewith.

Figure 4B:
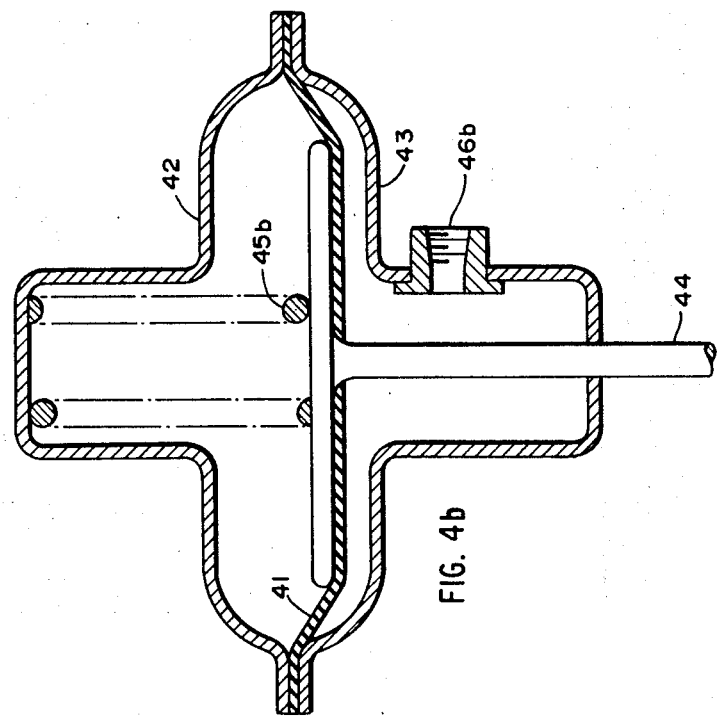
FIG. 4b shows the reverse arrangement of the control valve actuator, with which the invention valve trim may equally be employed.
Figure 4A:
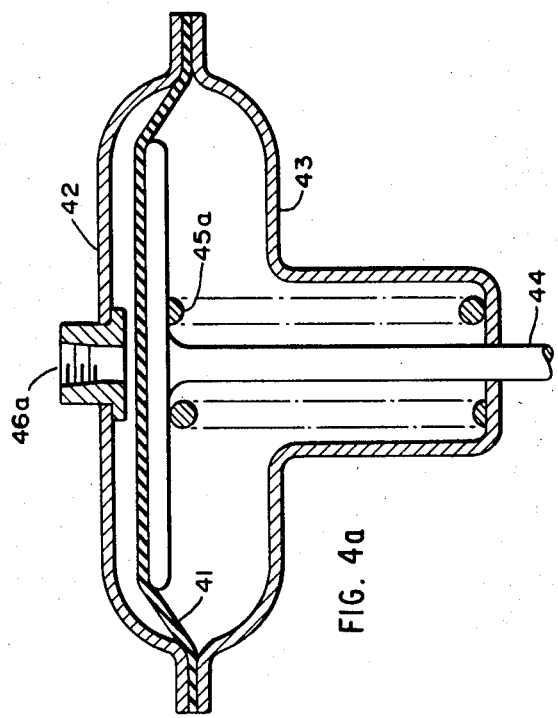
FIG. 4a shows a spring-diaphram control valve actuator with which the invention valve trim may be employed.

FIG. 4a shows one, and FIG. 4b the reverse, control valve actuator arrangement with which the invention trim may be employed. Such conventional actuator apparatus comprises a diaphragm 41 sealed between upper and lower cases 42, 43 which will be understood to be rigidly associated with the valve body 10, and whereby the diaphragm movement as transmitted through the actuator stem 44, to which it will also be understood the valve stem 23 is coupled, positions the valve plug 22 relative to its seat 35.

In the one FIG. 4a arrangement the diaphragm 41 is balanced between the underlying spring 45a and the controller air signal as supplied through upper case inlet 46a; and in the reverse FIG. 4b arrangement the diaphragm is balanced between the overlying spring 45b and the controller air signal as supplied through lower case inlet 46b.

As well understood by those skilled in the art, either of the FIGS. 4a and 4b arrangements may be employed, and for either direct (air-to-close) or reverse (air-to-open) actuation of the control valve. However, as also well understood, in the event of air loss, or controller signal failure for any reason, automatic corrective or fail-safe operation of the valve requires use of the direct acting (or spring-opening) actuator arrangement in some applications, and use of the reverse acting (or spring-closing) actuator arrangement in other applications.

Thus with a conventional control valve arrangement wherein the valve closes downwardly against an upfacing seat, the event of air loss would require resorting to the direct actuating embodiment of FIG. 4a for those applications wherein the fail-safe operation calls for the fluid flow to be maximized; and substitution of the reverse actuating embodiment of FIG. 4b for other applications wherein the fail-safe operation is to shut off the fluid flow. Further, the opposite of the just described substitution would be required for the corresponding applications, if there were utilized the alternative actuator arrangement wherein the valve is positioned below a down-facing seat and the direction of valve actuation is reversed as necessarily for the valve to close upwardly thereagainst.

Under this invention, however, and by reason of the capability which it supplies for reversal of valve positions, the necessity of shifting from one to the other actuator action, or valve operating direction, is eliminated, and the option is provided of selecting that one of the FIGS. 4a and 4b actuator arrangements and actions which may be preferred to be utilized as just described for all applications, and for all possible valve operating directions and failure positions.

I claim:

1. In a control valve, in combination, a valve body, said body apertured by a fluid passage defining
   inlet and outlet openings in said valve body;
   an intermediate, transverse partition interiorly dividing said fluid passage;
   a constricted annular opening through said interior passage partition;
   a disc plug smaller than said opening and adapted thereby for valve opening-closing movement to either side of said partition;
   tapered seating surfaces formed at the opposite faces of said disc plug;
   a stem on said plug;
   a valve body wall aperture opposite said partition;
   a bonnet engaged to said wall aperture and having a bore axially aligned with said partition opening;
   said bonnet receiving said stem and guiding said plug in said opening-closing movement relative to said transverse partition;
   an invertible valve trim cage, said trim cage having a generally tubular body relatively closely enclosing said plug and spaced from the wall of said passage;
   spaced, annular clamping faces formed on said cage body, said clamping faces engaging said cage body between said bonnet and said partition;
   means associated with said trim cage for seating said plug;
   a tapered surface formed on said plug seating means and mating with one of said tapered plug surfaces; and
   a balanced plurality of equidistantly spaced, transversely aligned, determined characteristics flow controlling openings through the wall of said cage body and arranged for covering and uncovering by said opening-closing movement of said plug;
   said openings differently characterized axially of said cage body whereby for the same movement of said plug the flow through said passage may be differently controlled by inverting said cage.

2. The apparatus of claim 1 wherein said means associated with said cage for seating said plug comprise an intermediate slip-in ring engaged between said cage and said partition.

3. The apparatus of claim 2, wherein said plug and ring have mating annular tapered sealing surfaces.

4. The apparatus of claim 2, wherein said ring and bonnet have cage-interfitting centering flanges extending within the opposite ends of said tubular body.

5. The apparatus of claim 1, wherein said cage is similarly formed at its opposite ends whereby said ends may be interchangeably engaged to said bonnet.

6. The apparatus of claim 1, wherein said balanced plurality of flow controlling openings through the wall of said tubular body are formed in one axial portion to one desired flow controlling characteristic and in the opposite axial portion to another desired flow controlling characteristic, and wherein said openings are arranged to have said one axial portion uncovered by the opening movement of said plug in one position of said cage, and to have said opposite axial portion uncovered by the opening movement of said plug in the inverted position of said cage.

7. The apparatus of claim 1, wherein said openings comprise four duplicate parallel openings equidistantly spaced around the wall of said cage.

8. The apparatus of claim 6, wherein said openings are formed in said one axial portion to a linear, and in said opposite axial portion to a percentage, flow controlling characteristic.

9. The apparatus of claim 1, wherein one of said clamping faces engages said partition and defines an intermediate flange of said cage body, whereby said cage body extends in one axial portion to one side and in an opposite axial portion to the other side of said partition; and wherein said port means comprise openings in said one and said opposite axial body portions, said openings being of one flow controlling characteristic in said one, and of a different flow controlling characteristic in said opposite, axial cage body portion, whereby said trim cage is adapted for opening-closing movement of said plug at both sides of, and for differentiated control of said flow at either side of, said partition.

10. The apparatus of claim 9, wherein said cage-associated plug seating means is an internal annular seat ring integral with said intermediate flange.

11. The apparatus of claim 10, wherein said cage body has similarly formed opposite ends whereby said cage is invertible in said valve body, and wherein said seating means and plug have mating opposite faces whereby said plug is closeable against said seating means both upon the inverting of said cage and upon its said flow controlling movement to either side of said partition.

12. The apparatus of claim 1, wherein said differently characterized port means comprise a set of similarly characterized openings in one axial portion, and a set of similarly characterized openings in another axial portion, of said cage body.

13. The apparatus of claim 12, wherein said one and other sets of openings are similarly positioned axially of said cage and relative to said plug movement.

14. The apparatus of claim 12, wherein each said set comprises four, identical, equidistantly spaced openings.

15. The apparatus of claim 1, wherein said flow controlling port means comprise one set of characterized openings in one axial cage body portion and another set of differently characterized openings in another axial cage body portion, and wherein the openings of said sets are similarly proportioned and correspondingly positioned for equal covering-uncovering by said same movement of said plug upon said inverting of said cage.

References Cited

UNITED STATES PATENTS

| | | | |
|---|---|---|---|
| 653,300 | 7/1900 | Lunken | 251—362X |
| 944,155 | 12/1909 | Shurtleff | 137—270 |
| 1,518,221 | 12/1924 | Reiber | 137—270 |
| 2,143,399 | 1/1939 | Abercrombie | 251—362X |
| 3,123,091 | 3/1964 | Elsey | 137—270 |

M. CARY NELSON, Primary Examiner

R. J. MILLER, Assistant Examiner

U.S. Cl. X.R.

137—270